United States Patent [19]

Kimura

[11] Patent Number: 4,758,690

[45] Date of Patent: Jul. 19, 1988

[54] COORDINATE DETECTING METHOD

[75] Inventor: Kiyoshi Kimura, Miyagi, Japan

[73] Assignee: Alps Electric Co., Ltd., Japan

[21] Appl. No.: 21,148

[22] Filed: Mar. 3, 1987

[30] Foreign Application Priority Data

Jul. 12, 1986 [JP] Japan .................... 61-162933

[51] Int. Cl.$^4$ ............................. G08C 21/00
[52] U.S. Cl. ...................................... 178/19
[58] Field of Search .................. 178/18, 19; 364/520

[56] References Cited

U.S. PATENT DOCUMENTS 4,616,107 10/1986 Abe et al. .................... 178/18

Primary Examiner—Stafford D. Schreyer
Attorney, Agent, or Firm—Guy W. Shoup; Glenn Ostrager; Leighton K. Chong

[57] ABSTRACT

A coordinate detecting method, adapted to a coordinate input device comprising an input plane having a plurality of parallel embedded loops, establishes a plurality of coarse regions while taking as a reference the polarity reversing positions of a magnetic field detected when these loops are scanned in sequence. The method comprises the steps of specifying one coarse region to be interpolated, interpolating the designation position of a coordinate designating member within the specified coarse region, and calculating the coordinate of the designation position on the basis of the coordinate position of the specified coarse region and an interpolation value obtained in the interpolating step.

4 Claims, 8 Drawing Sheets

COORDINATE DETECTING METHOD

BACKGROUND OF THE INVENTION

1. Field of the Invention

This invention relates to a coordinate detecting method adaptable to a coordinate input device for reading a designated position on an input plane at a high accuracy.

2. Description of the Prior Art

One coordinate inputting and detecting technique of reading a designated position on a plane at a high accuracy is disclosed in Japanese Patent Application No. 60-117761 filed by the present applicant. The coordinate input device of this first prior invention is configured so as to supply scan signals of the same phase concurrently to at least two conductors out of a plurality of parallel conductors embedded in a tablet, detect a signal generated by the scan signals supplied to that conductors by means of a coordinate designating member, perceive that the polarity of the detected signal has reversed, detect signal levels before and after this reversal of polarity, and calculate the position the coordinate designating member is designating on the basis of a coarse region on the coordinate where the reversal of polarity was perceived and the signal levels detected in the coarse region.

The coordinate calculating process disclosed in the foregoing application was proposed supposing that the polarity of a magnetic field reverses at the middle point between two selected conductors. Thus, there was a possibility that the reversing position shifts from the middle point owing to the magnetic field generated by a common conductor for supplying a scan current to each conductor, thereby sometimes resulting in the problem of causing a calculation error. Especially, in the case of the configuration wherein the conductors or loops are selected and scanned in sequence one at a time, the shift of the reversing position causes a very serious problem on the accuracy. This will be described in greater detail hereinafter.

FIG. 11 shows the distribution of detection voltage when the polarity reversing position has no shift. This distribution graph illustrates the interval of 10 mm$\leq$X$\leq$30 mm as an example, wherein the detection voltages owing to the respective loops reversing in polarity at X32 10, 15, 20, 25, and 30 mm are designated by $L_{10}$, $L_{15}$, $L_{20}$, $L_{25}$, and $L_{30}$, respectively. Although the distribution of magnetic field strength $H_z$ corresponding to each loop, $L_{10}$–$L_{30}$, is positive on the left side in the drawing of the zero point and negative on the right side, the voltage detected represents the absolute value of the magnetic field strength $H_z$. For convenience of explanation, the regions of 10 mm$\leq$X$\leq$20 mm, 15 mm$\leq$X$\leq$25 mm, and 20 mm$\leq$X$\leq$30 mm are referred to as segment 2 ($S_2$), segment 3 ($S_3$), and segment 4 ($S_4$), respectively.

Consider that a pickup is standing at position T (X=21 mm) in FIG. 11; hence, $H_z<0$ holds up to $S_4$, X=20 mm, whereas $H_z>0$ holds at $S_5$, X=25 mm. Thus, a system gets a detection voltage $V_2$ owing to loop $L_{25}$. Then, the system selects loop $L_{15}$, i.e. the preceding-but-one loop, $S_{5-2}=S_3$, X=25−10=15 mm, and gets a detection voltage $V_1$ owing thereto. Hence, in this exemplary operation, $S_3$ corresponding to the region of 15 mm$\leq$X$\leq$25 mm is selected as an object segment to be interpolated.

The case wherein the polarity reversing position has shifted will now be described with reference to FIG. 12. This example is illustrative of the distribution curve of magnetic field strength $H_z$ having shifted in the positive direction of X, wherein the loops and segments are indicated by the same reference symbols as in FIG. 11. It is also assumed that the pickup is standing at position T corresponding to X=21 mm.

In the case of FIG. 12, $H_z>0$ holds already at $S_4$, X=20 mm. Thus, the interpolation region is considered as $S_{4-2}=S_2$, hence, interpolation is going to be performed in the region of 10 mm$\leq$X$\leq$20 mm.

Accordingly, it will be appreciated that the interpolation calculation is performed with respect to that region being different from the region of the inherent segment, thereby resulting in an erroneous operation. In this example of FIG. 12, it is ideal to perform interpolation in $S_3$. Thus, even if the discrimination of segment were done in error, an improvement of accuracy will be expected if the interpolation segment is set as $S_4$.

To solve the aforementioned problem, the present applicant filed Japanese Patent Application No. 60-290797 and thereby proposed the process of comparing the absolute values of the detection voltages of a first loop from which the reversal of polarity of the magnetic field has first been detected by the coordinate designating member and a second loop preceding a given number of loops to the first loop in the direction of scanning to thereby determine a coarse region to be interpolated. This second prior invention obtains the comparative ratio between the absolute values of the detection voltages of the loops before and after the reversal of polarity has occurred to determine the coarse region which is subjected to interpolation. The principle of the foregoing process will now be described.

FIG. 10 shows the distribution of detection voltage obtained by the pickup, in which each curve is made straight for simplification. In the following description, similarly to the above, each segment is designated by $S_n$ (n: an integer) and the corresponding loop by $L_{5n}$, the interpolation regions are of 10 mm long each, the segments are defined so as to overlap each other by a length of 5 mm, and the loops are arranged at 5 mm intervals.

In the case of the distribution of detection voltage shown in FIG. 10, detection voltages $V_{n-2}$ and $V_n$ owing to loops $L_{n-2}$ and $L_n$ are used in performing interpolation using segment $S_{n-2}$. Let the X coordinate of the intersection point $C_1$ of detection voltages $V_{n-2}$ and $V_{n-1}$ be A and the X coordinate of the intersection point $C_2$ of detection voltages $V_{n-1}$ and $V_n$ be B. Then, $V_{n-2}$ has a smaller value than the other in the region of X<A and $V_n$ has in the region of X>B. In view of the performance of a circuit, it is preferred to employ a larger value than that at the intersection point $C_1$ of $V_{n-1}$ and $V_{n-2}$ and at the intersection point $C_2$ of $V_n$ and $V_{n-1}$, hence, it is desirable to perform interpolation always within the region of A$\leq$X$\leq$B. That is, where the pickup stands on the right side of X=5(n−1)mm in FIG. 10, the reversal of polarity is detected for the first time when loop $L_n$ is driven. Accordingly, to meet the foregoing requirements, segment $S_{n-2}$ must be selected when the pickup is within the region of 5(n−1)mm<X<B, whereas segment $S_{n-1}$ be selected when it is within the region of B<X<5n mm. As the results of such selection, it is always possible to get detection voltages larger than those at the aforementioned points $C_1$ and $C_2$ and define the optimal region as the interpolation one.

Accordingly, the algorism of deducing the optimal segment with respect to the range of $A<X<B$ is as below.

Assume that in the course of driving loops $L_0, L_1, \ldots$ in sequence, the reversal of polarity of the magnetic field strength $H_z$ has been detected for the first time upon coming to loop $L_n$. Under this condition, $$\left. \begin{array}{l} 1 \ S_{n-2} \text{ is selected when } |V_n/V_{n-1}| \geq 1 \\ (V_{n-2}, V_n \text{ are used in interpolation}) \\ 2 \ S_{n-1} \text{ is selected when } |V_n/V_{n-1}| < 1 \\ (V_{n-1}, V_{n+1} \text{ are used in interpolation}) \end{array} \right\} \quad (1)$$

If so selected as above, the detection voltages for use in interpolation are always within the interpolation region and higher than the voltages at the intersection points $C_1$ and $C_2$, hence, it is possible to ensure a certain accuracy on interpolation.

An exemplary process of selecting the segments in accordance with the above algorism is shown in FIGS. 13 and 14. FIGS. 13 and 14 show the distribution of detection voltage in the vicinity of $Y=100$ mm and the interpolation regions corresponding to the respective distribution curves, in which rectangular blocks illustrated below the X axis represent the aforementioned segments S and it is intended to select one segment for interpolation when the pickup stands within the shaded portion thereof. However, the amount of shift of the field polarity reversing position becomes large in a peripheral portion of the input plane and the positions corresponding to A and B of FIG. 10 also shift such that they tend to come close to the segment boundary or come off a little from the segment concerned. In such a case, the aforementioned conditional equations are changed to 1 $S_{n-1}$ is selected when $|V_n/V_{n-1}|<2$ 2 $S_{n-2}$ is selected when $|V_n/V_{n-1}|\geq2$ By the use of the algorism above it becomes possible to select a proper segment.

The foregoing second prior invention selects a proper segment through obtaining the comparative ratio of the voltage values. Although it is necessary to change the reference value of the comparative ratio with respect to the periperal portion of the input plane, this prior invention makes it possible to use a proper segment in the vicinity of position A or B of FIG. 10 with respect to the peripheral portion of the input plane. However, this process has a fear that a voltage to be used in interpolation will take a small value and that a coordinate output will become unstable when performing the detection of high accuracy, thereby resulting in a bad effect on the accuracy of detection. Further, since the detection is performed after changing the reference value of the comparative ratio depending upon a segment number, there is an anxiety that the algorism of detection will become too complicated.

In view of the foregoing, the present applicant filed Japanese Patent Application No. 61-106837 which proposes a coordinate detecting method of performing coordinate detection by the use of a comparatively simple algorism wherein the segments are offset a preset distance in the shift direction of the field polarity reversing position and an object segment is selected depending only upon the relative magnitude of $V_n, V_{n-1}$.

A coordinate input device disclosed in the foregoing third prior application will now be described.

FIG. 9 is a fundamental block diagram of the coordinate input device. In this drawing, the device comprises an input plane $2b$ equipped with main loops $2a$ and a compensating loop $3a$, a driver $2$ for sending a current of certain amplitude from an oscillator $1$ to the main loops $2a$, another driver $3$ for sending a current to the compensating loop $3a$, a pickup $6$ including a magnetic field detecting coil and functioning as the coordinate detecting member, an amplifier circuit $7$ for amplifying the output of the pickup $6$, a polarity discriminator circuit $8$, a detector circuit $9$, sample-hold amplifiers $11$ and $12$, a multiplexer $13$, an A/D converter $14$, a ROM table $15$ functioning as a first memory means storing therein compensation values, another ROM table $16$ functioning as a second memory means storing therein correction values for correction of errors of interpolation values, and a control circuit $10$. In addition, there are provided an X-direction switching circuit $4$ in connection with the X-direction group of main loops $2a$ and a Y-direction switching circuit $5$ in connection with the Y-direction group of main loops $2a$.

The main loops $2a$ are embedded mutually parallelly in the input plane $2b$ at 5 mm intervals; one end of each loop L being connected to the switching circuit $4$ (or, to the switching circuit $5$ in the case of the Y-direction group) with the other end connected to a source line $2s$, and are dimensioned so as to form an input plane surface measuring, for example, $200 \text{ mm} \times 200 \text{ mm}$ as a whole. The source line $2s$ is connected to the driver $2$. The Y-direction loops are similarly arranged and oriented so as to intersect orthogonally the X-direction loops.

The compensating loop $3a$ is formed by a conductor independent of the main loops $2a$, which is disposed in the vicinity of the source line $2s$ of the main loops $2a$ so as to surround all the main loops $2a$, one end of this compensating loop $3a$ being connected to the driver $3$ for sending thereto a current of certain amplitude in reverse to the current flowing through the source line $2s$ of the main loops $2a$ with the other end grounded. In the ROM table $15$ functioning as the first memory means storing therein compensation values, there are stored compensation values pertinent to respective loops L and Y-direction (or X-direction) regions.

In this ROM table $15$ are stored compensation values ISC relating to all the segments $S_n$ and to the respective main loops corresponding to the segments $S_n$ under the condition of the detection height $Z=15$ mm. In operation, a pertinent compensation value ISC is called up by the control circuit $10$ in accordance with the detection results of the control circuit $10$ and used to calculate an interpolation value by means of an arithmetic means included in the control circuit $10$.

The ROM table $16$ functioning as the second memory means storing therein correction values is used to obtain an accurate coordinate position from the thus calculated interpolation value through correction of its error. Specifically, in this table are stored correction values corresponding, for example, to each 0.1 mm increment of the interpolation value pertinent to the segment detected.

The pickup $6$ includes in its tip portion the magnetic field detecting coil, a voltage produced by this magnetic field detecting coil being sent via the amplifier circuit $7$ to the detector circuit 9 and the polarity discriminator circuit 8.

The operation of the foregoing coordinate input device will now be described.

The process of detecting the position of the pickup 6 is achieved principally through the three steps of detecting a coarse position or a segment of the pickup 6, performing interpolation or detecting a fine position within the thus detected segment, and combining the segment position and the fine position within the segment.

At the time of segment detection, first, the drivers 2 and 3 are operated by the use of a sinusoidal wave generated by the oscillator 1. As a result, a current is caused by the driver 2 to flow through the loops L in sequence, one specified via the switching circuits 4 and 5 by the control circuit 10 at a time. During the above, a current having an amplitude equal to one-half that of the current flowing through the main loop 2a is caused by the driver 3 to flow through the compensating loop 3a.

As the individual loops L are scanned by the current, the magnetic field generated by the effective loop L is sensed by the pickup 6 and amplified by the amplifier circuit 7 into a signal of desired amplitude. This signal is compared in terms of phase with the output of the oscillator 1 by the polarity discriminator (phase comparator) circuit 8. In other words, the polarity of the magnetic field is detected at this time. Assume that the output of the polarity discriminator circuit 8 was "H" when the loop L on the left-hand side in the drawing of the pickup 6 was driven. Hence, the polarity of the magnetic field detected reverses when the loop L on the right-hand side of the pickup 6 is driven, as a result, the output of the polarity discriminator circuit also reverses and becomes "L".

Therefore, as the loops L are selected and supplied in sequence with the current in the order of $X_0$, $X_1$, $X_2$, ... $X_n$, loop $L_n$ is detected in the vicinity of the pickup 6 by which the output of the polarity discriminator circuit 8 was reversed. After the perception of this loop $L_n$, the system detects a voltage $V_n$ owing to this loop $L_n$ and another voltage $V_{n-1}$ owing to the preceding loop $L_{n-1}$, compares the two voltages $V_n$ and $V_{n-1}$, and determines in accordance with a given algorism a region (segment) to be interpolated.

If an object segment ($S_{n-2}$, for example, in FIG. 10) is determined, the control circuit first selects loop $L_{n-2}$ located at the left-hand end of that segment $S_{n-2}$. Then, the signal passed through the pickup 6 and the amplifier circuit 7 is converted by means of the detector circuit 9 into a dc signal and held in the sample-hold circuit 11 in the form of a dc voltage.

Thereafter, the control circuit 10 selects loop $L_n$ located at the right-hand end of segment $S_{n-2}$, and similarly to the above, another dc voltage obtained by the detector circuit 9 is held in the sample-hold circuit 12. Then, the voltages held in the sample-hold circuits 11 and 12 are selected by the multiplexer 13 in accordance with the signal from the control circuit 10 and converted by the A/D converter 14 into a digital form to get the voltages $V_{n-2}$ and $V_n$ owing to loops $L_{n-2}$ and $L_n$.

Then, the control circuit 10 turns off all the switching circuits 4 and 5. As a result, the aforementioned predetermined current flows only through the compensating loop 3a. By A/D-converting a detected output it is possible to obtain a voltage $V_c$ pertinent to the compensating loop 3a through the same process as above.

Subsequently, the control circuit 10 calls up from the ROM table 15 a compensation value ISC corresponding to the value (the distance) of the segment obtained through segment discrimination in the X-/Y-direction, and causes the arithmetic means included in the control circuit 10 to calculate an interpolation value P' by substituting the detected voltages $V_{n-2}$, $V_n$ and $V_c$ and the ISC in the following equation (2) involving the compensation value:

$$P' = \frac{V_{n-2} - ISC \cdot V_c}{V_{n-2} + V_n} \quad (2)$$

If this interpolation value P' is calculated, the ROM table 16, in which correction values P for correction of the aforementioned errors are stored, is accessed to obtain a coordinate value which specifies a position within the segment. Then, the positional coordinate ($S_n \times 5.0 + \alpha$) of the segment and the coordinate value P within that segment are combined by the arithmetic means included in the control circuit to calculate the ultimate X coordinate of the designation position of the pickup 6 in accordance with the following equation:

$$X = (S_n \times 5.0 + \alpha) + P(\text{mm})$$

where $S_n$: the segment number
P: the correction value obtained by amending the interpolation value
$\alpha$: the amount of shift of segment S (for example, $\alpha = -2.5$, 0, $+2.5$, which is preset in accordance with the presence/absence and the direction of the offset of the segment and is adequately selected by a software).

A similar group of segments is defined with respect to the Y direction, thus, the system can calculate the Y coordinate of the designation position through a similar detection operation and deliver the calculated coordinate value via an interface circuit 17 to the side of a host computer.

As described hereinabove, because coordinate detection errors arise due to the shift of the polarity reversing position of the magnetic field, the aforementioned prior inventions intended to reduce errors as far as possible by introducing the compensation value or correction value to interpolate a correct coordinate position between segments, or by selecting a segment providing less errors.

These prior ideas were originated from the configuration wherein the segments are defined on the basis of a given spacing between loops. Therefore, because the arrangement of segments was determined from the viewpoint of hardware without consideration of the amount of shift, the algorism of calculation became complicated.

SUMMARY OF THE INVENTION

The present invention has been devised in view of the aforementioned technical circumstances. The object of the present invention is to provide a coordinate detecting method which can detect a coordinate using a comparatively simple algorism by establishing segments or regions in consideration of the behavior of shift.

To achieve the above object, the present invention provides a coordinate detecting method of detecting a coordinate position on an input plane, which comprises the steps of: establishing a plurality of coarse regions while taking as a reference the polarity reversing positions of a magnetic field detected when a scan signal is sent to the input plane equipped with a plurality of main loops made of parallel embedded conductors such that the main loops are driven in sequence by the scan signal, specifying a coarse region to be interpolated, interpolating the designation position of a coordinate designating member within the specified coarse region, and calculating the coordinate of the designation position on the input plane designated by the coordinate designating member on the basis of the coordinate position of the specified coarse region and an interpolation value obtained in the interpolating step.

According to the present process, it is possible to calculate speedily an accurate coordinate position by the use of a comparatively simple algorism through the steps of establishing segments while taking as a reference the polarity reversing positions of a magnetic field detected, entering polarity reversing position data in a ROM table, interpolating a coordinate designated by a coordinate designating member within a pertinent segment, and adding/subtracting the amount of deviation of the segment to/from an interpolation value obtained in the interpolating step.

In describing exemplarily with reference to FIG. 1 explanatory of a calculation principle, assume that loops $L_n$ and $L_{n+2}$ are scanned under the condition that the coordinate designating member is standing at position X. Let a detection voltage owing to loop $L_n$ be $V_n$ and another detection voltage owing to loop $L_{n+2}$ be $V_{n+2}$. Then, an interpolation value $X_p$ within segment $S_n$ defined by polarity reversing positions $X_n$ and $X_{n+2}$ is given by $$X_p = \frac{V_n}{V_n + V_{n+2}} \quad (3)$$

The X coordinate of the coordinate designating member between loops $L_n$ and $L_{n+2}$ is obtained by addition of the amount $O_n$ of deviation of segment $S_n$ from loop $L_n$ as follows:

$$X = X_p + O_n \quad (4)$$

In the case, the value of X can easily be obtained if the value of $O_n$ is previously stored in the ROM table.

BRIEF DESCRIPTION OF THE DRAWINGS

FIGS. 1 through 8 are explanatory of an embodiment of the present invention, in which FIG. 1 is a drawing explanatory of the calculation principle of coordinate detection of the present invention;

FIG. 2 is a drawing illustrative of a segment discriminating process;

FIG. 3 is a drawing illustrative of segments and shift directions; and

FIGS. 4 through 7 are diagrams showing observed errors;

FIG. 8 is a flowchart illustrative of a detection process;

FIGS. 10 through 14 are explanatory of conventional systems, in which

FIG. 10 is a drawing exemplatory of a segment discriminating process;

FIGS. 11 and 12 are drawings explanatory of the relationship between detection voltage and segment; and FIGS. 13 and 14 are diagrams showing observed shifts of segments.

DESCRIPTION OF THE PREFERRED EMBODIMENT

An embodiment of the present invention will now be described with reference to the drawings.

FIGS. 2 through 8 are explanatory of the embodiment of the present invention. The configuration and circuit of a coordinate input device adapted for the embodiment are substantially identical with those of the conventional device, except for the ROM table 18 storing therein the amount of deviation of segment S; hence, no further description is given here with respect to the identical portion. Further, an identical or similar element to that of the conventional device is designated by the same reference symbol as in the conventional device.

Figure 1:
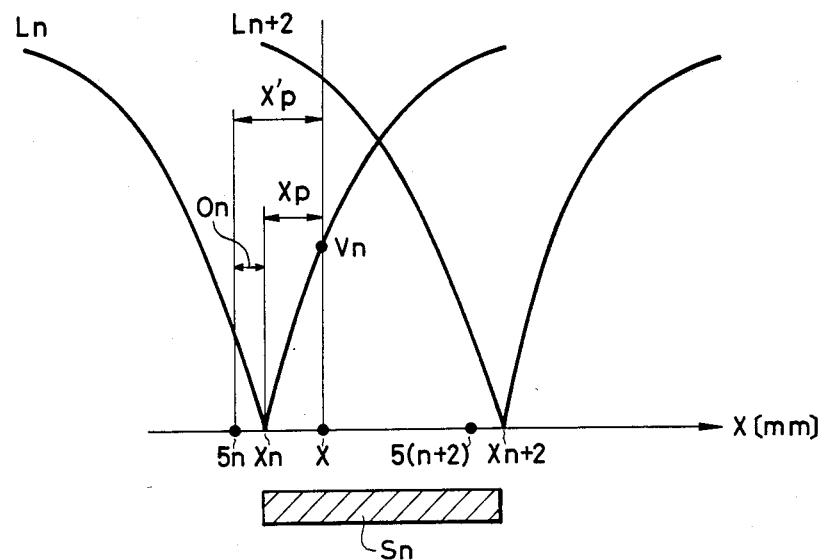
Figure 2:
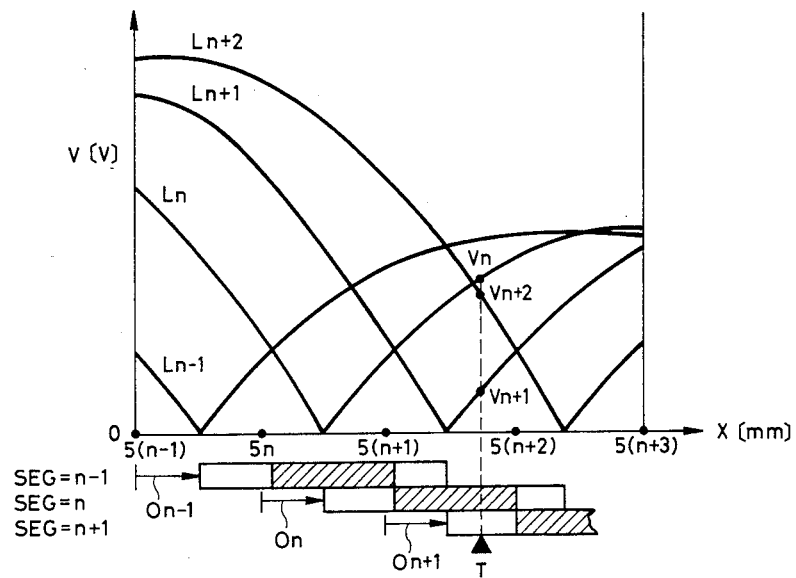

FIG. 2 illustrates loops L and voltage distribution curves owing to the magnetic field produced when these loops L are scanned. In this drawing, the distance, 5n, in the X direction of loops $L_n$ (n=0-39) disposed at a pitch of 5 mm as in the case of the conventional device is shown on the horizontal axis and the absolute value of detection voltage on the vertical axis. Although the conventional system defines segment $S_n$ on the basis of the position of loop $L_n$, the present invention defines segment $S_n$ on the basis of the polarity reversing position detected of a magnetic field. That is, the start point of the n-th segment $S_n$ is defined by a spot at which a detection voltage $V_n$ becomes zero when the n-th loop $L_n$ is scanned, whereas the end point is defined by another spot at which a detection voltage $V_{n+2}$ becomes zero when loop $L_{n+2}$ subsequent but one to $L_n$ is scanned. Accordingly, although adjoining segments S overlap partially each other, the field reversing position, i.e. the spot at which the detection voltage $V_n$ (n=0-39) becomes zero, is always taken as the start point or end point even if the amount of shift increases, thus, the object segment $S_n$ to be interpolated can be selected by the use only of the aforementioned conditional equation (1).

Describing exemplarily, assume that the pickup 6 is standing at position T in FIG. 2. Hence, the field polarity changes for the first time when the (n+2)th loop $L_{n+2}$ is scanned. Letting a detection voltage owing to loop $L_{n+2}$ which is detected by the pickup 6 be $V_{n+2}$ and another detection voltage owing to loop $L_{n+1}$ be $V_{n+1}$, the two voltages $V_{n+2}$ and $V_{n+1}$ are compared and the conditional equation (1) is referred to. As a result, the following is given:

$$|V_{n+2}/V_{n+1}| \geq 1$$

Thus, segment $S_n$ which is effective when the n-th loop $L_n$ is scanned is judged as the object segment S to be interpolated. Therefore, it is possible to obtain an interpolation value $X_p$ from the equation (3) using detection voltage values $V_{n+2}$ and $V_n$.

Figure 4:
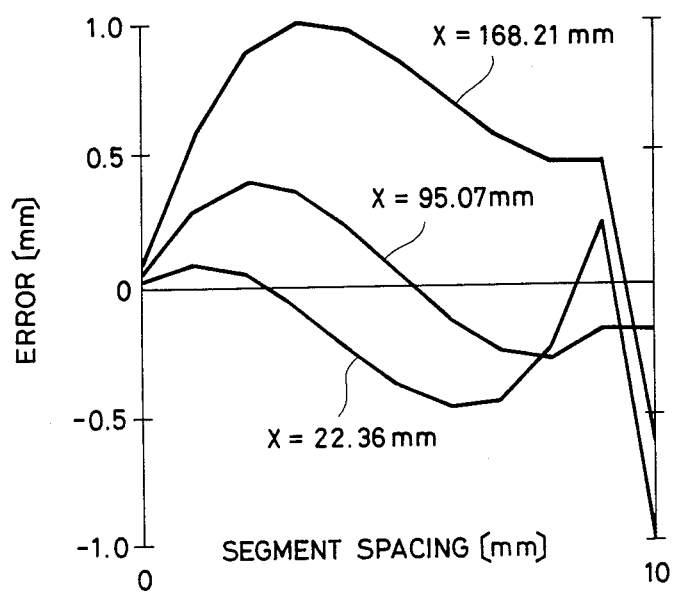

Error or discrepancy between interpolation value and ideal value is shown in FIG. 4. Specifically, the graph of FIG. 4 shows errors pertinent to loop $L_5$ of X=20 mm, i.e. segment $S_5$ with the start point X=22.36 mm; loop $L_{19}$ of X=95 mm, i.e. segment $S_{19}$ with the start point X=95.07 mm; and loop $L_{34}$ of X=170 mm, i.e. segment $S_{34}$ with the start point X=168.21 mm, or errors within the positional range of 10 mm measured from each start point.

According to FIG. 4, it will be appreciated that in the area (X≧100 mm) on the left-hand side of the center C of the input plane 2b, the error does not exceed substantially 0.5 mm even when the aforementioned equation (3) is used as it is, whereas in the area (X>100 mm) on the right-hand side it increases in excess of the former when the equation (3) is used.

Figure 3:
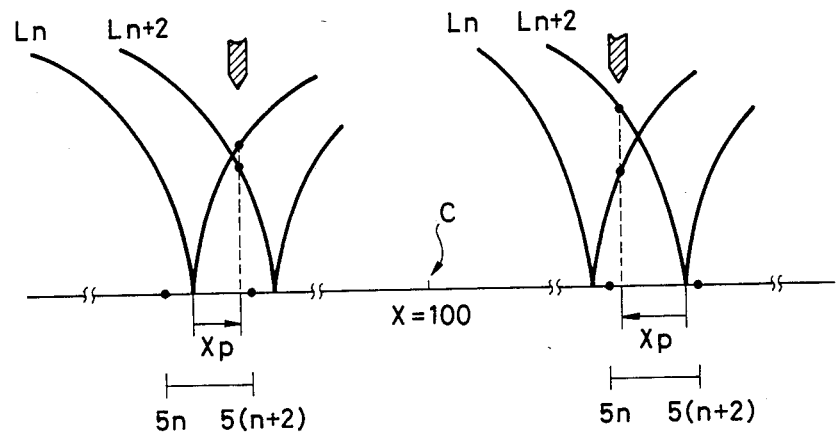

Thus, because of the symmetry in arrangement of the loops L of the input plane 2a, if the equation:

$$X_p = \frac{V_{n+2}}{V_n + V_{n+2}} \quad (5)$$

is used with respect to the area (X>100 mm) on the right-hand side of the center of the input plane 2b and the magnetic field reversing position observed when loop $L_{n+2}$, which is closer to the end point of segment $S_n$, is scanned is taken as a reference, the error pertinent to the right-side area is expected to be compatible in magnitude with that of the left-side area of the center C calculated by the equation (3). The foregoing process is shown in FIG. 3. That is, while taking the position of the center C (X=100 mm) of the input plane 2b as a reference, the interpolation value is calculated in the increasing direction of X with respect to the left-side area (X≦100 mm), and in the decreasing direction of X with respect to the right-side area (X>100 mm).

Figure 5:
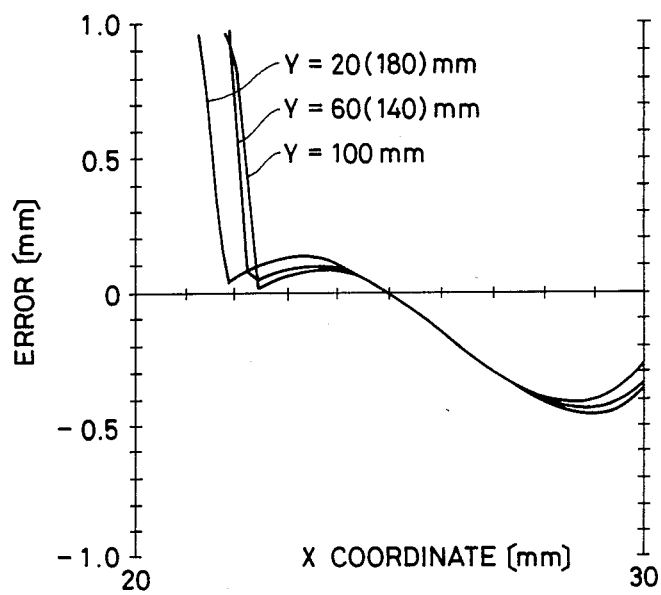
Figure 6:
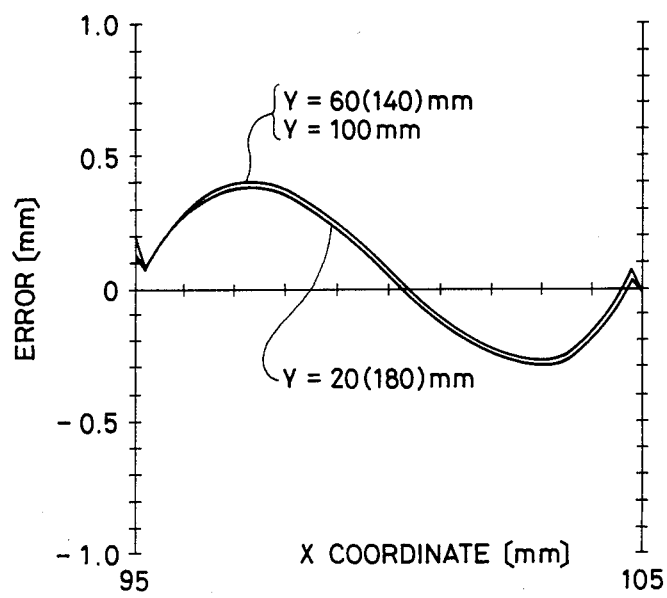
Figure 7:
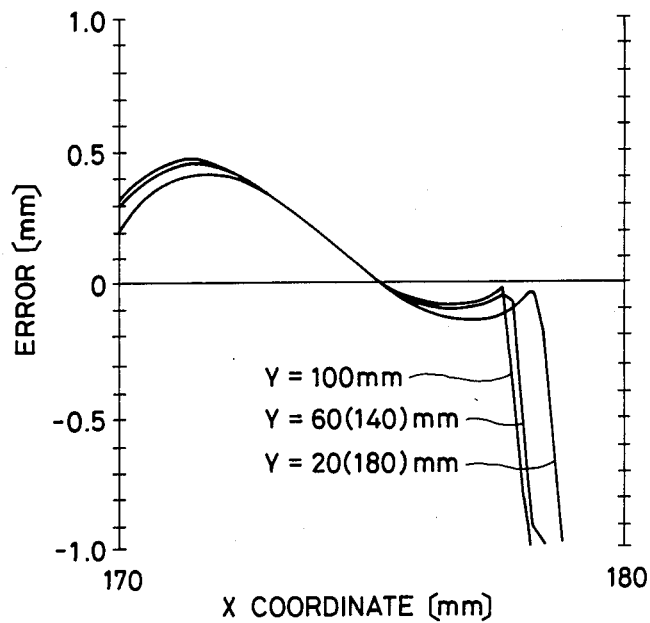
Figure 10:
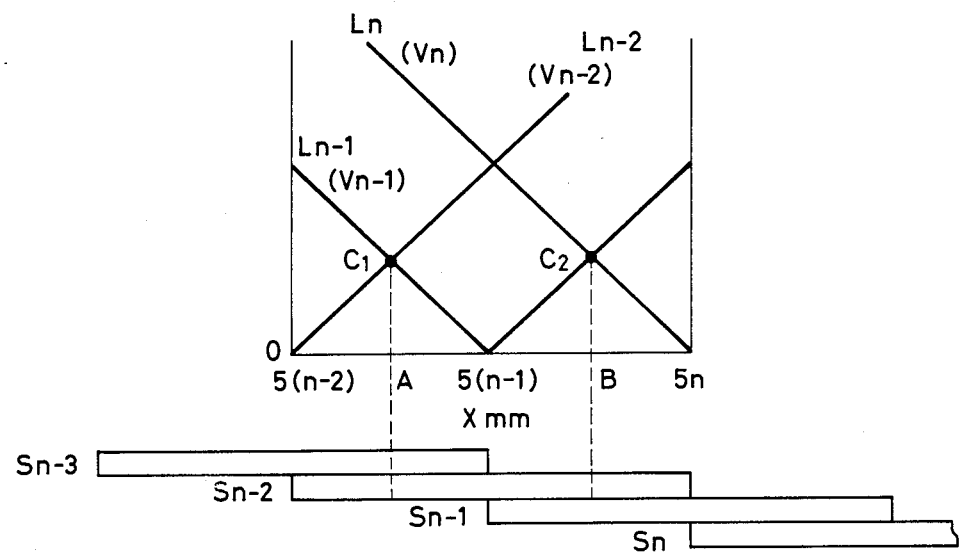

Discrepancy between interpolation value calculated in the manner above and ideal value is shown in FIGS. 5 through 7. Specifically, FIG. 5 shows errors in the interval of 20 mm≦X≦30 mm, FIG. 6 shows errors in the interval of 95 mm≦X≦105 mm, and FIG. 7 shows errors in the interval of 170 mm≦X≦180 mm (which is symmetrical to FIG. 5 about X=100 mm) at five points Y=20, 60, 100, 140, and 180 mm, wherein the start point or origin of each graph corresponds to the position (5n mm) of respective loop $L_n$ to be driven shown in FIG. 3.

As will be apparent from these graphs, the error increases abruptly after passed over the field polarity reversing position, but, it falls within the range of ±0.5 in the whole surface of the input plane 2b, except for the above.

Figure 9:
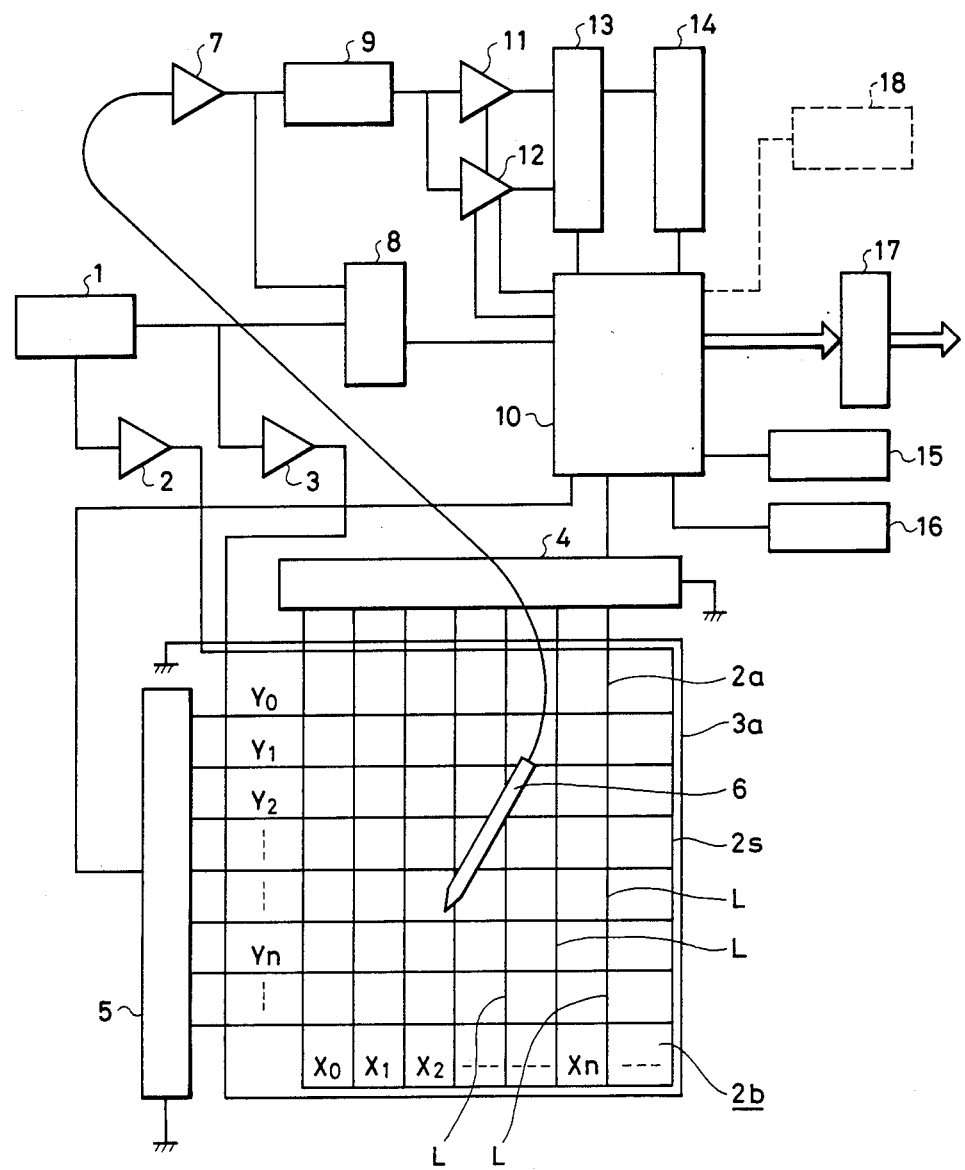
FIG. 9 is a fundamental block diagram of a coordinate input device according to a conventional system which is also applicable to the present embodiment.
Figure 11:
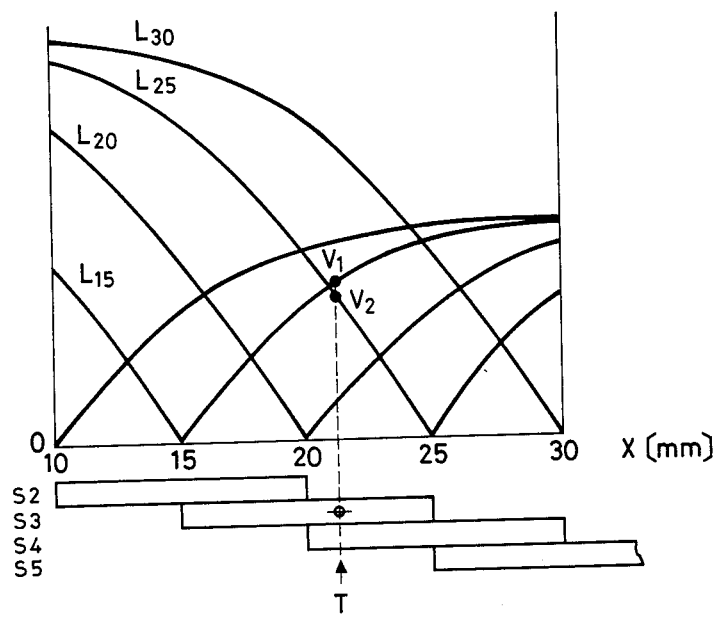
Figure 12:
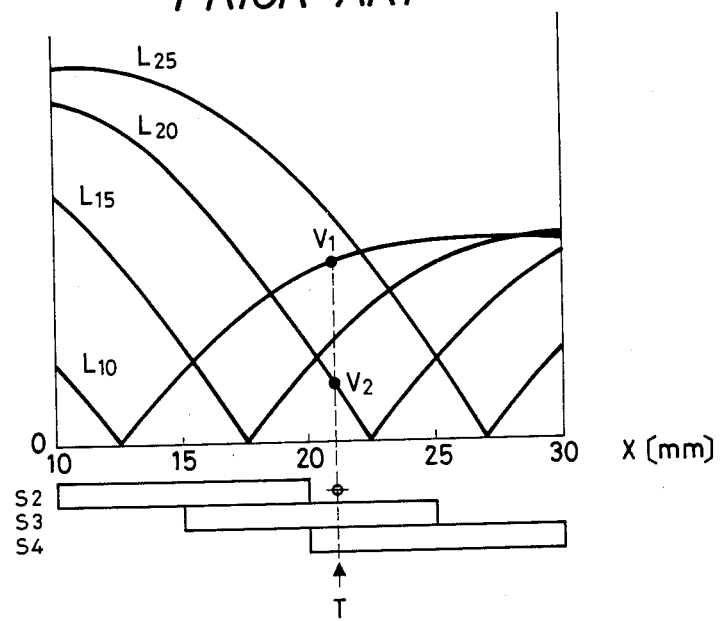
Figure 13:
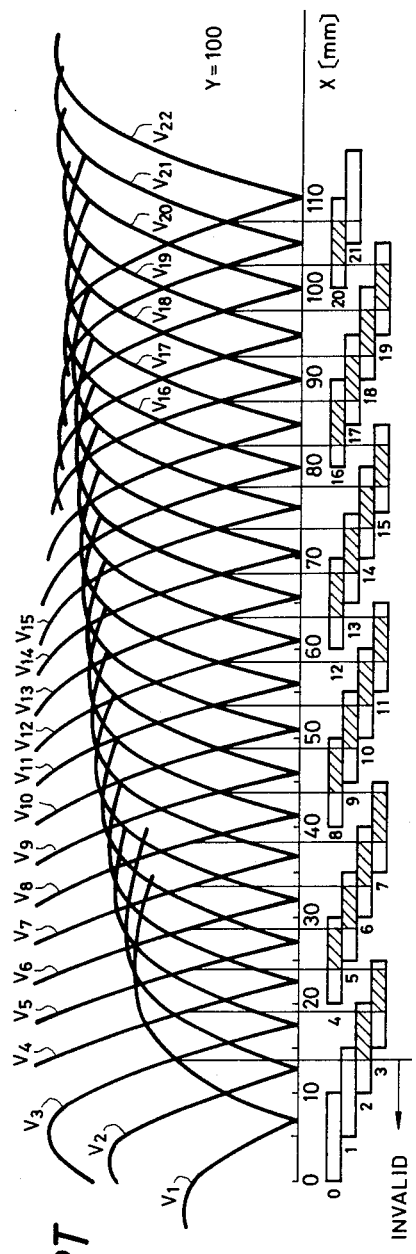
Figure 14:
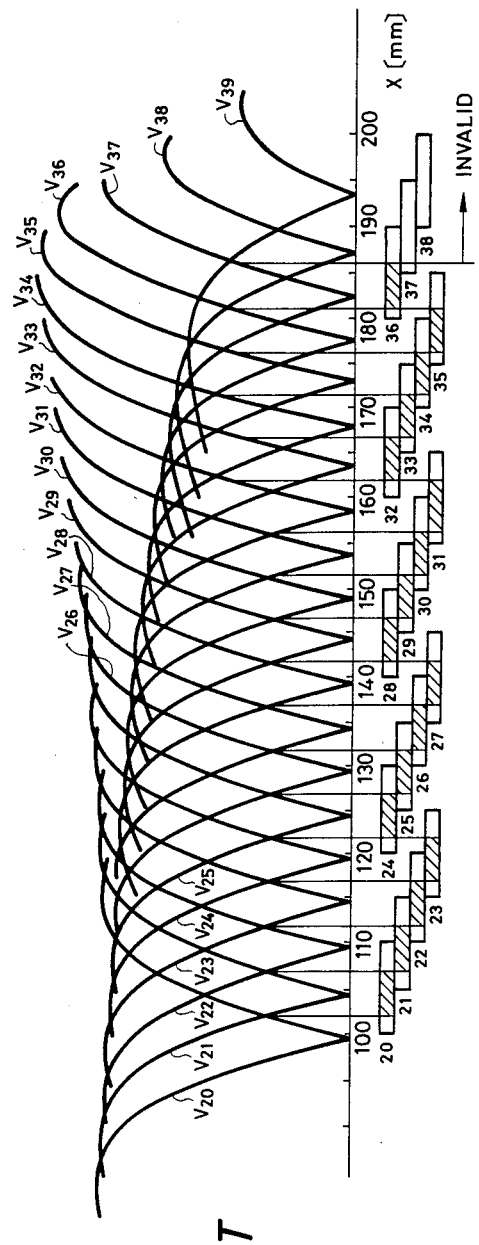

To calculate an actual coordinate using the interpolation value $X_p$ detected in the manner above, it is necessary to store the field polarity reversing position in the ROM table 18. In this connection, if the absolute position of the polarity reversing position is to be ROM-tablized as it is, its data volume is too large for one byte to accommodate. Hence, in the embodiment, the amount $O_n$ (n=0-39) of deviation from the position of loop L is stored in the ROM table. Accordingly, the ROM table 15 of FIG. 9 becomes unnecessary. In practice, the amount $O_{n-1}$, $O_n$, $O_{n+1}$ of deviation from the position of loop $L_{n-1}$, $L_n$, $L_{n+1}$ corresponding to 5(n−1), 5n, 5(n+1)mm shown in FIG. 2 is ROM-tablized and stored in the ROM table 18. Subsequently, letting the segment number be n, the amount of deviation be $O_n$ mm (n=0-40), and the interpolation value be $X_p$, the X coordinate pertinent to the left-side portion of the center C of the input plane 2b is calculated in accordance with the following equation:

$$X = 5.0 \cdot n + O_n + 10 \cdot X_p \text{(mm)} \quad (6)$$

where $X_p = V_n/(V_n + V_{n+2})$, and the same pertinent to the right-side portion of the center C is calculated in accordance with the following equation:

$$X = 5.0 \cdot (n+2) - O_n - 10 \cdot X_p \text{(mm)} \quad (7)$$

where $X_p = V_{n+2}/(V_n + V_{n+2})$.

The Y coordinate can be calculated in accordance with a similar process to the case of the X coordinate, whereby it is possible to detect both the X- and Y-direction coordinates of the pickup 6 on the input plane 2b. Incidentally, because both the foregoing equations (6) and (7) are employed, the symmetry in both the X and Y directions with respect to the center C should be taken into consideration deeply.

Further, there is another calculation process wherein in connection with the resolution of interpolation, 10 mm, for example, is divided by 256 and the length of one fraction, 0.04 mm, is treated as a unit. In this case, the data of deviation amount $O_n$ will also be handled taking the resolution of interpolation as a unit, and the interpolation value $X_p$ obtained through interpolation calculation and the deviation amount $O_n$ will be represented each by an integer from 0 to 255. If so digitized, the X coordinate value pertinent to the left-side portion of the center C of the input plane 2b can be calculated in accordance with the following equation:

$$X = 50\, n + (X_p + O_n)\frac{100}{256} \; (10^{-1} \text{ mm}) \quad (8)$$

where $X_p = V_n/(V_n + V_{n+2})$ and n=the segment number (0≦n≦20), and the same pertinent to the right-side portion of the center C of the input plane 2b can be calculated in accordance with the following equation:

$$X = 50\,(n+2) - (X_p + O_n)\frac{100}{256} \; (10^{-1} \text{ mm}) \quad (9)$$

where $X_p = V_{n+2}/(V_n + V_{n+2})$ and n=the segment number (21≦n≦39).

Figure 8:
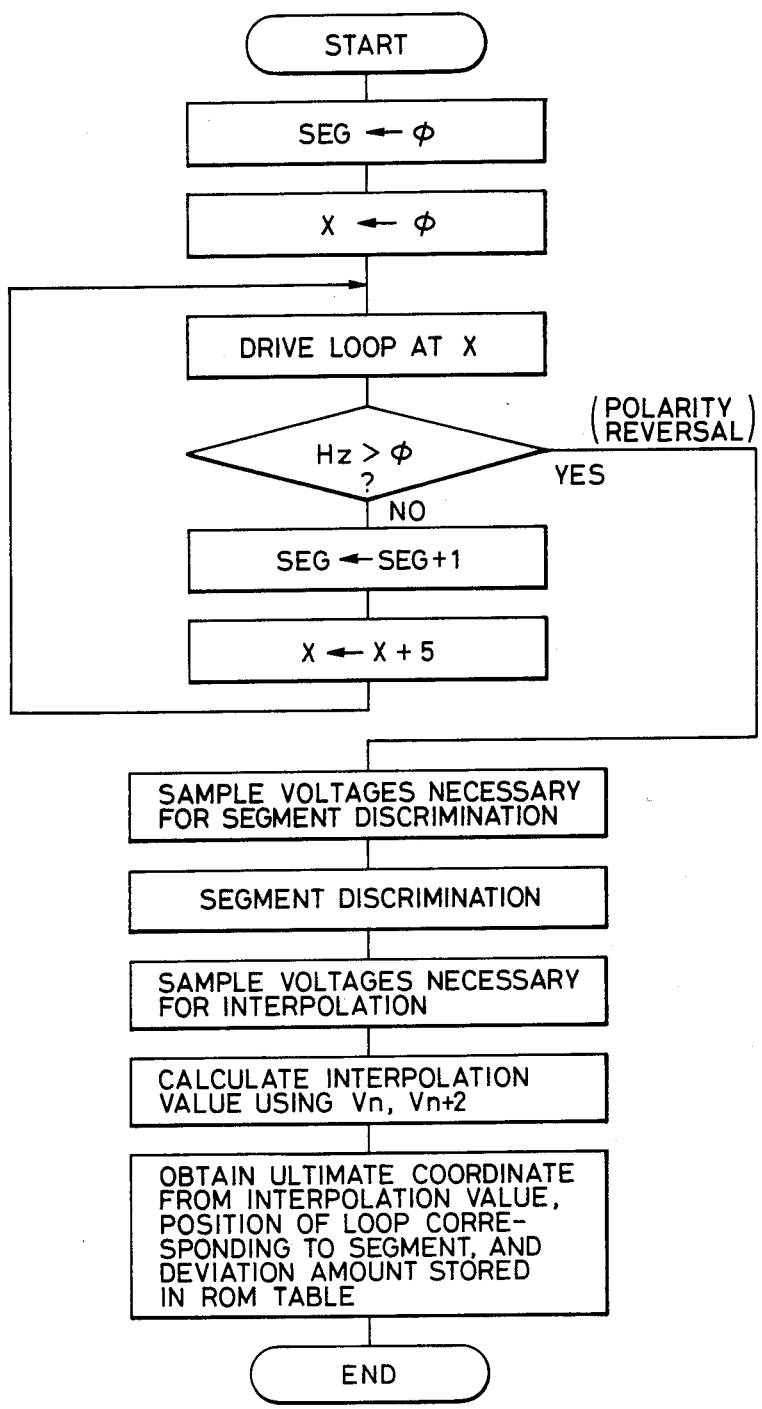

FIG. 8 shows a coordinate detection process or flowchart of performing calculation in such a manner as above. The operation of a coordinate input device embodying the present invention will now be described with reference to the flowchart, but, the description of the steps up to the detection of polarity reversal is omitted because these steps are identical with those of the conventional process.

Upon scanning the loops L, loop $L_n$ is detected which is located in the vicinity of the pickup 6 and by which the output of the polarity discriminator circuit 8 is reversed. The voltage $V_n$ owing to this loop $L_n$ is compared with the voltage $V_{n-1}$ owing to the proceding loop $L_{n-1}$, and a segment, $S_{n-2}$ or $S_{n-1}$, to be interpolated is determined in accordance with the algorism represented by the aforementioned equation (1). After the determination of the segment S (for example, $S_n$ of FIG. 2), the control circuit 10 selects loop $L_n$ (the loop at X=5n) corresponding to the start point of that segment. At this time, the signal passed through the pickup 6 and the amplifier circuit 7 is converted into a dc signal by the detector circuit 9 and held in the sample-hold amplifier 11 in the form of a dc voltage.

Then, the control circuit 10 selects loop $L_{n+2}$ (the loop at $X=5(n+2)$) corresponding to the end point of segment $S_n$, and a similarly obtained dc voltage is held in the sample-hold amplifier 12. The voltages held in these sample-hold amplifiers 11 and 12 are converted by the multiplexer 13 and the A/D converter 14 into digital values, as a result, the voltages $V_n$ and $V_{n+2}$ pertinent to loops $L_n$ and $L_{n+2}$, respectively, are obtained.

Then, the interpolation value $X_p$ is calculated by an arithmetic circuit included in the control circuit 10 in accordance with the aforementioned equation (3) or (5). After the calculation of the interpolation value $X_p$, the pertinent deviation amount $O_n$ is taken out from the ROM table 18 having the deviation amounts $O_n$ of the segments S stored therein corresponding to the segment numbers, and the ultimate X coordinate value is obtained using the aforementioned equation (8) or (9). With respect to the Y direction, a similar process is performed to obtain an object Y coordinate. These X coordinate and Y coordinate are combined together, whereby the detection of the position on the input plane 2b of the pickup 6 is completed.

As will be appreciated, the embodiment provides the following effects:

1 Since there is no need of introducing the compensation value in the interpolation calculation, the calculation is simplified and the computing speed is enhanced;

2 Since there is no need of detecting the detection voltage $V_c$ owing only to the compensating loop 3a at the time of the interpolation calculation, a switching means for connecting and disconnecting the compensating loop 3a is unnecessary, thus, the cost is reduced and the computing speed is enhanced because no switching step is required;

3 Since the data of deviation amount $O_n$ of the field polarity reversing position are directly related to the coordinate value, the data can be corrected easily in experiment;

4 No special consideration is necessary to be paid for the shift of segment which involves the deviation amount of the polarity reversing position in the peripheral portion of the input plane 2b and for the segment discrimination algorism relative to the peripheral portion, and one kind is enough for the segment discrimination algorism, thus, the system becomes simple; and 5 Since the steps up to the interpolation calculation can be performed separately between the X direction and the Y direction, and the system can be designed so as to access the ROM table 18 for the first time at the step of combining the coordinate values, the computing process becomes simple and the computing speed can be enhanced.

As described hereinabove, the present invention detects the designation position on the input plane of the coordinate designating member by the steps of: establishing the coarse regions on the input plane where the coordinate designating member stands while taking as a reference the polarity reversing position of the magnetic field detected when the scan signal is sent to the conductors embedded in the input plane in sequence, performing interpolation within the coarse region, and composing the designation position of the coordinate designating member on the basis of the coordinate position of the coarse region and the interpolation value obtained in the interpolation step.

Therefore, according to the present invention, the coarse region to be interpolated can be specified by the use of one kind of segment discrimination algorism, hence, a program for the algorism becomes simple. The interpolation value can be calculated only from the detection voltages used in segment discrimination, hence, for calculation of the interpolation value there is no need of introduction of the compensation value and the like and detection of the voltage from the compensating loop. Consequently, the computing speed can be enhanced and the performance of this kind of coordinate input device can be improved.

What is claimed is:

1. A coordinate detecting method comprising the steps of:

establishing coordinate positions of a plurality of coarse regions while taking as a reference the polarity reversing positions of a magnetic field detected when a scan signal is sent to scan an input plane equipped with a plurality of main loops made of parallel embedded conductors such that the main loops are driven in sequence by the scan signal;

specifying one coarse region, in which a coordinate designating member is located, to be interpolated;

interpolating a designated position of the coordinate designating member located within the specified coarse region; and calculating the coordinate of the designated position on the input plane designated by the coordinate designating member on the basis of the coordinate position of the specified coarse region and an interpolation value obtained in the interpolating step, wherein the coordinate position of the specified coarse region is obtained by accessing a ROM table storing therein a deviation amount ($O_n$, n=an integer) between the coordinate position of each loop ($L_n$) and the coordinate position of a start point of the corresponding coarse region ($S_n$) so as to obtain a pertinent deviation amount, and by adding it to the coordinate position of the corresponding loop ($L_n$).

2. A coordinate detecting method according to claim 1, wherein each coarse region ($S_n$, n=an integer) is established as starting at the point where a detection voltage ($V_n$) owing to the corresponding loop ($L_n$) is zero and ending at the point where a detection voltage ($V_{n+2}$) owing to the loop ($L_{n+2}$) succeeding but one to that loop ($L_n$) is zero.

3. A coordinate detecting method according to claim 2, wherein the coarse region to be interpolated is determined as $S_n$ if $|V_{n+2}/V_{n+1}| \geq 1$ when the magnetic field polarity detected by the coordinate designating member reverses for the first time upon scanning the loop $L_{n+2}$, otherwise is determined as $S_{n+1}$, where $V_{n+2}$ and $V_{n+1}$ are the detection voltages owing to loops $L_{n+2}$ and $L_{n+1}$, respectively.

4. A coordinate detecting method according to claim 2, wherein the interpolation value $X_p$ pertinent to the coarse region $S_n$ specified is calculated in accordance with either of the following equations:

$$X_p = \frac{V_n}{V_n + V_{n+2}}$$

and $$X_p = \frac{V_{n+2}}{V_n + V_{n+2}}$$

where $V_n$ and $V_{n+2}$ are the detection voltages owing to loops $L_n$ and $L_{n+2}$, respectively.

* * * * *